United States Patent [19]

Ivey

[11] 4,106,368

[45] Aug. 15, 1978

[54] TRANSMISSION CONTROL SYSTEM

[75] Inventor: John Saxon Ivey, Bloomfield Hills, Mich.

[73] Assignee: Borg-Warner Corporation, Chicago, Ill.

[21] Appl. No.: 753,329

[22] Filed: Dec. 22, 1976

[51] Int. Cl.² .............. B60K 41/18

[52] U.S. Cl. .............. 74/866

[58] Field of Search .............. 74/863, 864, 865, 866, 74/337, 867, 868, 869; 251/141

[56] References Cited

U.S. PATENT DOCUMENTS

| | | | |
|---|---|---|---|
| 3,447,773 | 6/1969 | Huber | 251/141 X |
| 3,732,753 | 5/1973 | Olsen et al. | 74/866 |
| 3,890,360 | 6/1975 | Pruvot et al. | 74/866 X |
| 3,941,015 | 3/1976 | Robinson | 74/864 X |
| 4,008,567 | 2/1977 | Hirsch | 74/866 X |

*Primary Examiner*—Samuel Scott
*Assistant Examiner*—Lance W. Chandler
*Attorney, Agent, or Firm*—Robert L. Zieg

[57] ABSTRACT

A control system used to change the gear ratio in a gear set regulated by a signal from an electronic control unit is disclosed. A transducer provides an output torque signal which is compared to other signals for controlling the gear change. The ratio change is accomplished through a friction element engaged by hydraulic pressure. A unique diaphragm and solenoid control valve is used responsive to the electronic control unit to follow a shift control ramp to insure a smooth shift.

8 Claims, 6 Drawing Figures

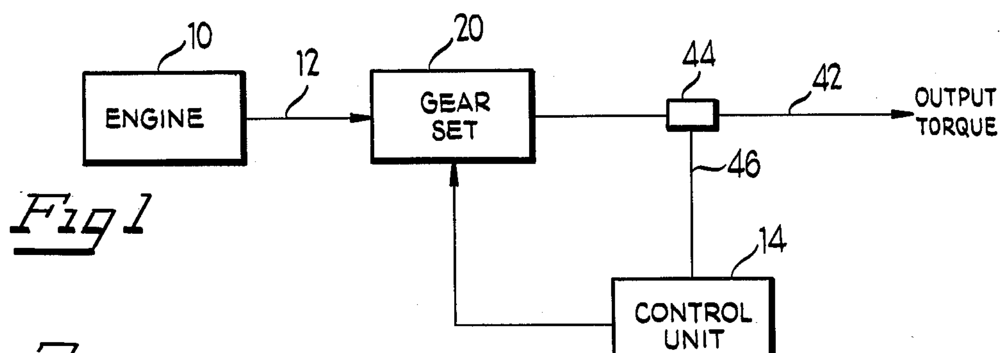
10
ENGINE
12
20
GEAR SET
44
42
OUTPUT TORQUE
46
14
CONTROL UNIT
Fig 1

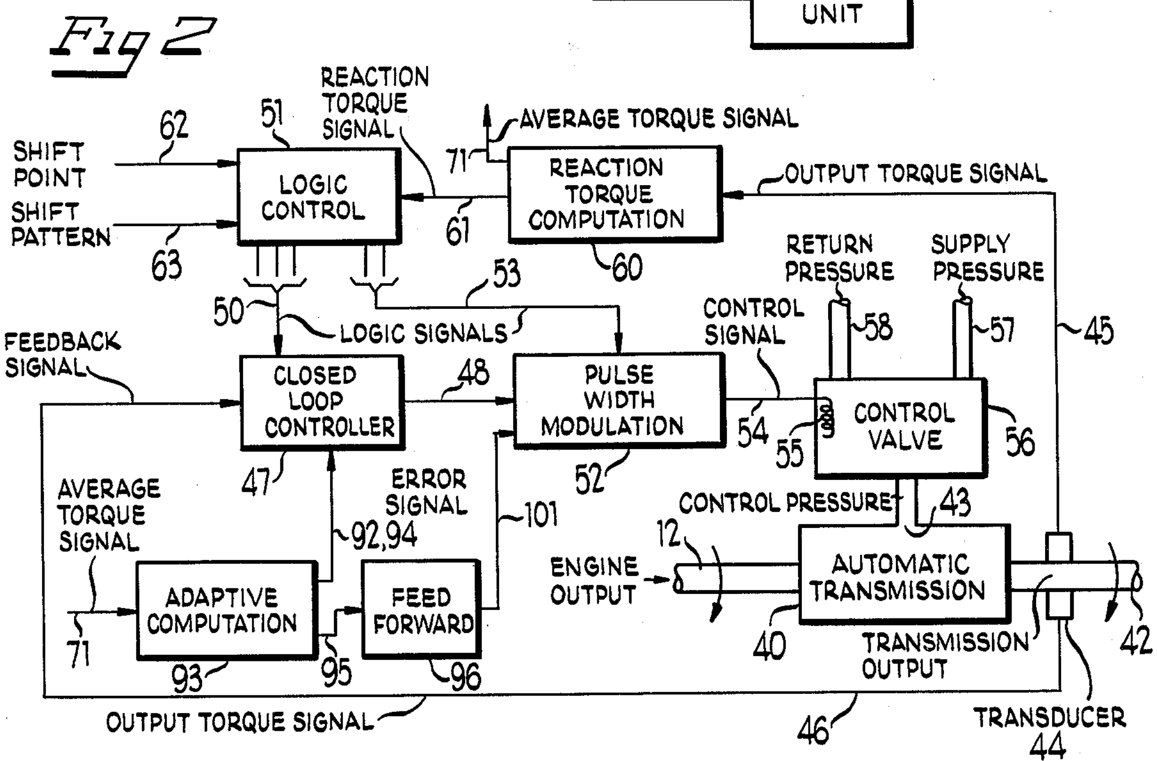
Fig 2
REACTION TORQUE SIGNAL
AVERAGE TORQUE SIGNAL
62
51
SHIFT POINT
LOGIC CONTROL
71
REACTION TORQUE COMPUTATION
OUTPUT TORQUE SIGNAL
SHIFT PATTERN
61
63
60
RETURN PRESSURE
SUPPLY PRESSURE
53
50
LOGIC SIGNALS
CONTROL SIGNAL
58
57
45
FEEDBACK SIGNAL
CLOSED LOOP CONTROLLER
48
PULSE WIDTH MODULATION
54
55
CONTROL VALVE
56
AVERAGE TORQUE SIGNAL
47
ERROR SIGNAL
101
52
CONTROL PRESSURE
43
92,94
12
ENGINE OUTPUT
AUTOMATIC TRANSMISSION
ADAPTIVE COMPUTATION
FEED FORWARD
71
93
95
96
40
TRANSMISSION OUTPUT
42
OUTPUT TORQUE SIGNAL
46
TRANSDUCER 44

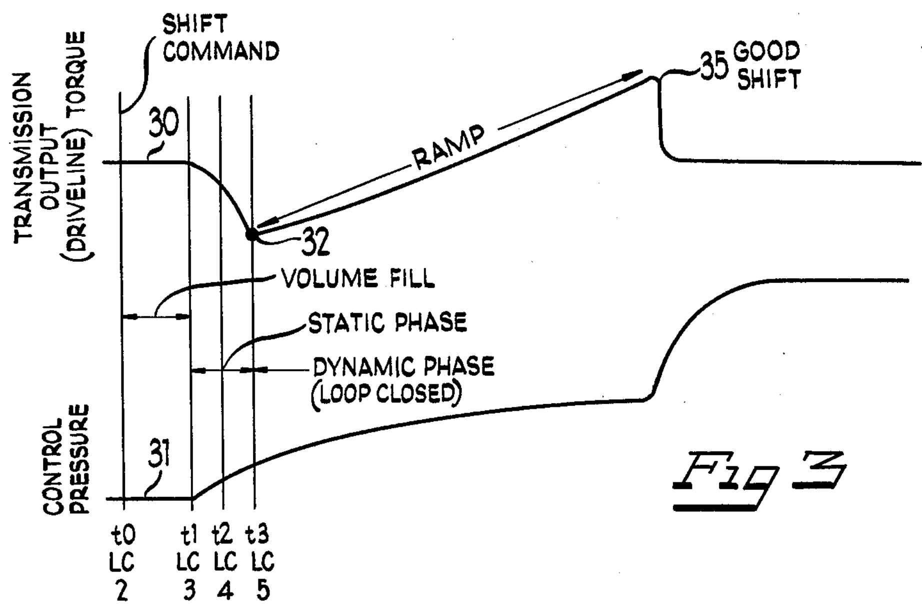
SHIFT COMMAND
TRANSMISSION OUTPUT (DRIVELINE) TORQUE
30
RAMP
35 GOOD SHIFT
32
VOLUME FILL
STATIC PHASE
DYNAMIC PHASE (LOOP CLOSED)
CONTROL PRESSURE
31
Fig 3
t0 LC 2
t1 LC 3
t2 LC 4
t3 LC 5

SHIFT POINT COMPUTER
SHIFT PATTERN LEVER
LOGIC CONTROL
MEMORY
REACTION TORQUE COMPUTER
PWM
LOOP COMPENSATION
MEMORY
GAIN CONTROL
RAMP
GAIN
FEED FORWARD
ADAPTIVE COMPUTER
CLOSED LOOP CONTROLLER

PM
PD
PS
PC
PRESSURE
0
T0
T1
T2
T3
T4
T5
TIME

LC3
ADAPTIVE COMPUTER 93
141
142
143
144
145
92
RAMP
140
71
AVERAGE DRIVELINE TORQUE
141a
142a
143a
145a
94
GAIN
141b
142b
143b
145b
95
TO FEED-FORWARD

TRANSMISSION CONTROL SYSTEM

BACKGROUND OF THE INVENTION

Various systems have been devised and implemented to control the change of gear ratios in a power-shifted transmission. This is generally done with a hydraulic system, including a hydro-mechanical control valve mechanism for modifying the pressure applied to various friction elements in the transmission and to selectively hold and release different components of a planetary gear set. For example, the engine output shaft can be connected to drive the sun gear of such a set, which also includes a plurality of planet gears rotatable on a carrier element and disposed between the sun gear and the outer ring gear. When the ring gear is held against rotation, output drive torque is available from the planet carrier at a first speed ratio. To change ratio, the sun gear is locked to the outer ring gear, which is no longer held against rotation, providing a direct drive connection. This is the operation which occurs in a typical upshift.

A great deal of research has been directed to optimizing the shift "quality". In general, it is not desirable to have a shift of very brief duration, as this produces a jerk by the rapid change in vehicle acceleration, which is very noticeable and found objectionable by most drivers. If the shift time is stretched out for too long a period, undue wear is imposed on the friction elements and other components of the transmission. Therefore, the optimum shift quality occurs somewhere between the too-short time duration, producing the objectionable jerk sensation, and the too-long time duration producing the objectionable component wear.

An electronic control system for accomplishing a proper shift which will have requisite quality is enclosed and claimed in copending application Ser. No. 661,896, filed Feb. 27, 1976 of common assignee.

The object of this invention is to provide a unique control valve which is compatible with the electronic control of the aforementioned application which will result in a compact valve unit which should result in economy of manufacture.

SUMMARY OF THE INVENTION

In a general sense the invention includes an electronic control system for regulating the change of gear ratio in a gear set, whether sensed and/or accomplished by fluid, mechanical or electrical components. A control unit is used to effect the gear change when it receives a change-gear signal. An important aspect of the invention is the use of a transducer to provide an output torque signal which is used in effecting the change of the gear ratio. The transducer is positioned to sense the transmission output torque and to provide an electrical signal which varies as a function of that torque. A control valve varies the fluid pressure to the energized friction element to effect a change in gear ratio, and an error signal is provided to control the valve operation.

The control valve comprises a very compact valve of the diaphragm type which may be easily controlled by a solenoid which is in turn controlled by the electronic control system. A closed loop controller is coupled between the transducer and the control valve to receive the torque indicating signal and provide the error signal for varying the control valve operation to engage a friction device by having the pressure buildup in the friction device follow a desired ramp or schedule.

THE DRAWINGS

In the several figures of the drawings, like reference numerals identify like components, and in those drawings;

FIG. 1 is a block diagram showing the general environment of the present invention;

FIG. 2 is a block diagram of an electronic control system constructed in accordance with the present invention;

FIG. 3 is an idealized graphical illustration useful in understanding the shift characteristics of an automatic transmission;

Figure 4:
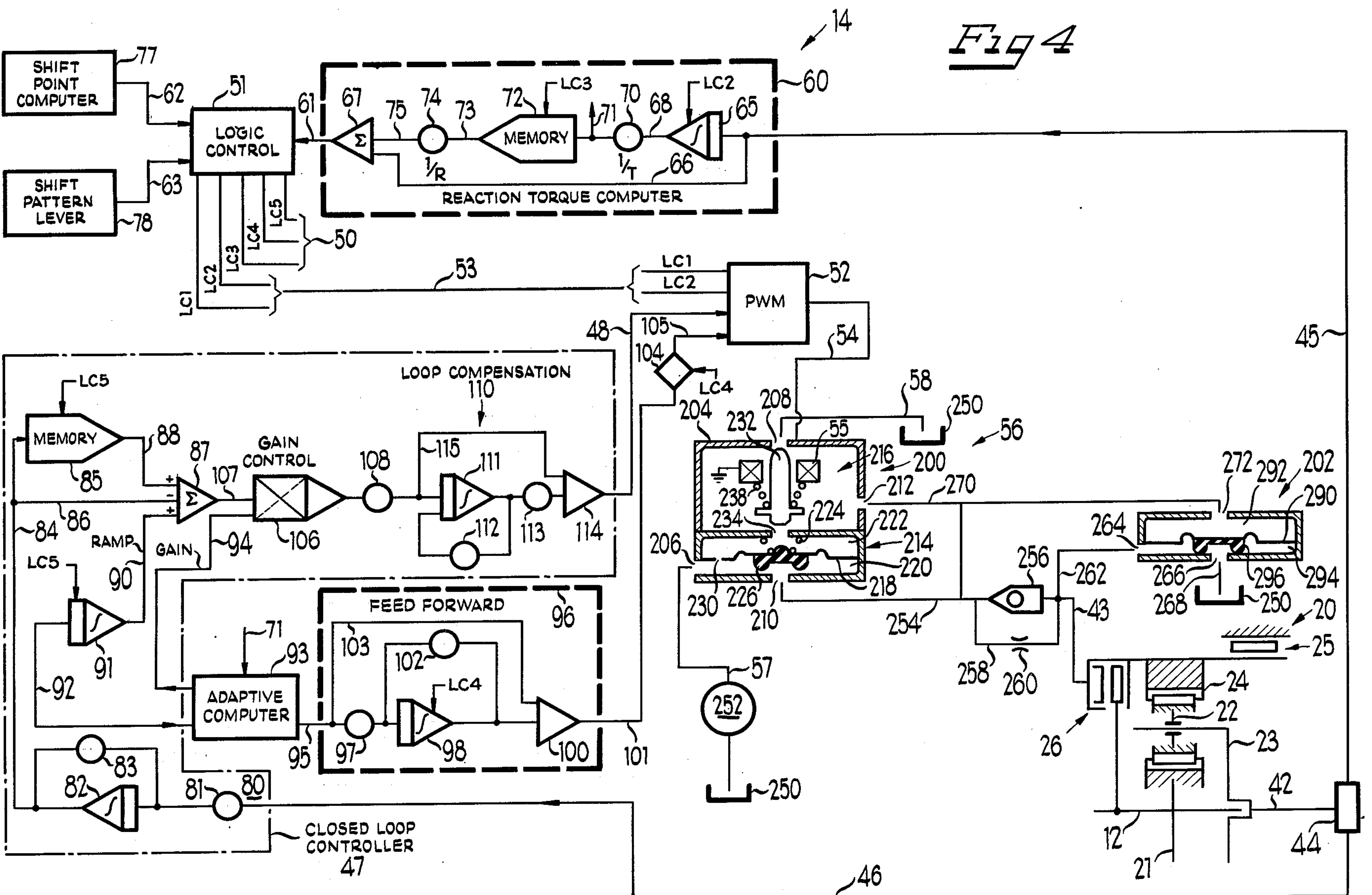
FIG. 4 is a block diagram, partly in schematic form, similar to FIG. 2 but depicting additional details of the present invention.

FIG. 1 shows the general environment for the control system of the present invention comprising an engine 10 driving a shaft 12 with a control system 14 to control a transmission or gear set 20. Gear set 20 has an output shaft 42 with which a torque sensor 44 is operatively associated. Torque sensor 44 is connected to control 14 by a conductor 46.

FIG. 4 includes a schematic representation of a planetary gear set 20, of a type which may be used in automatic transmissions. Planetary gear set 20 is adapted to provide a drive relationship between drive shaft 12 and driven shaft 42. A sun gear 21 is connected to shaft 12, which represents the input drive to the automatic transmission. That is, drive shaft 12 and sun gear 21 receive drive from engine 10 or other prime mover. Meshed with sun gear 21 are a plurality of pinion gears 22, mounted on a planetary carrier 23 which is connected to driven shaft 42. A ring gear 24, is provided meshing with the planet gears as they rotate with respect to the ring gear. In general when sun gear 21 is driven with ring gear 24 held stationary, output drive torque is available from planet carrier 23 and driven torque is available from planet carrier 23 and driven shaft 42. A one-way clutch 25 is provided, schematically illustrated as connected between ground or a stationary member and ring gear 24. Those skilled in the art will appreciate that a band or other reactive member can be used in lieu of a one-way clutch. A friction clutch 26 is schematically illustrated as engageable to connect ring gear 24 and sun gear 21 for rotation together.

If the ring gear 24 is locked against rotation, then the planet gears 22 are rotated and carrier 23 driven when the sun gear is driven, and output drive at a first reduced speed ratio may be taken from driven shaft 42. When it is desired to change the speed ratio or shift, ring gear 24 is released and ring gear 24 is connected with sun gear 21. This provides a direct drive between the input and output shafts at a second speed ratio of 1:1. Of course additional combinations of planet and ring gears can be provided to produce a multiplicity of speed ratios in an automatic transmission, but the showing in FIG. 4 is sufficient for a background discussion of the present invention. One-way clutch 25 holds ring gear 24 against rotation in one direction to establish the reduced drive ratio and permits free rotation of ring gear 24 in the other direction. Clutch 26 is engaged to directly connect the sun gear with the ring gear, to provide the second speed ratio.

FIG. 3 illustrates two different curves 30 and 31, useful as an example of a power upshift. Curve 30 denotes the torque at the transmission output connection, generally termed driveline torque. Curve 31 represents the pressure acting on the piston of the oncoming friction element. At the outset the driveline torque is equal to the engine output times the gear ratio (neglecting efficiency), and the element pressure remains at zero; at time *t0* a shift command is initiated. This command can be supplied by the operator or received from a shift point computer in a manner well known and understood by those skilled in the art. Between time *t0* and time *t1*, the transmission remains the "volume fill" phase of the shift operating sequence, as the piston volume of the actuator is being filled with virtually no change in the control pressure and no change in the torque. This occurs because even though fluid is being admitted under pressure to engage the friction element, there is a certain amount of slack, or open space in the piston, this volume must be filled before there is an actual physical engagement of the friction element with the reaction member. At time *t1* the "static" phase of the shift sequence is commenced, as the oncoming friction element begins to apply torque to is associated gear or other component. In the static phase, from *t1* to *t3*, the control pressure and torque are changing, but there is no change in the engine speed. Provision is made herein of a feed-forward circuit, to be explained hereinafter, to compensate for the system operating delay which would otherwise result from the time required to fill the piston volume and commence the static phase of the shift at time *t1*.

At the time *t2* the system is half-way through the static phase of the shift. Subsequently, it will be apparent that the system generates a particular logic command signal for use at this time, but for the present it is sufficient to note that the control pressure is still rising at time *t2*, and the driveline torque is still dropping as the oncoming friction element begins to apply a force to its associated gear. At time *t3* the static phase of the shift is completed, and one-way clutch 25 has been released. As shown at point 32 on the torque curve 30, the driveline torque begins to increase at this time, *t3*, which also marks the end of the static phase and beginning of the "dynamic" phase of the shift. It is at this time—beginning the dynamic phase of the shift—that the control loop of the present system is closed, as will be explained hereinafter.

The change in the driveline torque can occur over a short, medium or long time span. If the shift is accomplished in a relatively short time, this results in poor "feel", or an objectionable jerk being felt by the driver. If the dynamic phase of the shift is extended over a very long time, this imposes excess wear on the transmission and associated components. One satisfactory compromise is represented by curve 35. This means that the shift occurs over a sufficiently brief time duration so that excess component wear is not caused, and likewise that the driver does not feel a jerk or rapid transition in the shift. A discussion of the shift quality is set out in the above mentioned copending application. It is toward the production of a good quality shift, such as represented by curve 35, that the present invention is directed.

DESCRIPTION OF THE PREFERRED EMBODIMENT

FIG. 2 depicts in a block arrangement an electronic control system developed in accordance with this invention for changing the gear ratio in an automatic transmission 20. An input shaft 12 represents the input mechanical driving connection to the transmission. The output driving connection of the transmission, which would be taken from the carrier as described above, is represented by the shaft 42. This shaft is normally coupled to a shaft for driving the vehicle wheels. In addition the transmission includes at least one fluid inlet 43 for receiving a fluid under pressure to control the friction element and thus control the change of gear ratio.

A transducer 44 is positioned to sense the torque at the output driving connection of the transmission, and to provide an electrical signal which is a function of the output torque, on each of lines 45 and 46. A closed loop controller 47 comprises a plurality of components, as will be explained hereinafter, for providing an error signal or line 48 as a function of both the output torque signal received as a feedback signal over line 46, and a plurality of logic command signals received over line 50 from a logic control circuit 51. The error signal on line 48 is applied to a pulse width modulation circuit 52, which also receives a plurality of logic command signals over line 53 from the logic control circuit. The output signal from the pulse width modulation circuit 52 is a control signal which is applied over line 54 to a winding 55 which is part of an electro-hydraulic control valve 56, the output side of which is coupled to the inlet 43 of the automatic transmission. Conduit 57 is connected to receive a fluid under pressure from a pump (not shown) in a manner well known and understood in this art. Conduit 58 is a return pressure line connected to the sump.

A reaction torque computation circuit 60 is connected to receive the output torque signal over line 45 and produce, an output 61, a computed reaction torque signal for application to the logic control circuit 51. The logic control circuit also receives a signal over line 62 representing a shift point, to indicate issuance of a shift command. A shift pattern signal can be generated and supplied over line 63 to the logic control circuit 51. The shift pattern signal on line 63 is that provided when the driver moves the shift level into a position (that is, a position such as "park", "reverse", "neutral", "drive" and so forth) which changes the operation of a control valve (not shown), and "tells" the electrical system which shifting phase is selected. The shift point signal on line 63 is derived from a unit (not shown) which issues a signal when a shift—up or down— should be initiated. Electronic systems for providing this signal are also available. For purposes of this explanation, conductor 62 is considered as means for providing a shift point signal, and conductor 63 is deemed means for providing a shift pattern signal. The logic control circuit 51 receives the reaction torque signal, the shift point signal and the shift pattern signal (an explanation of the shift pattern signal is not necessary to an understanding of the basic system operation), and provides a plurality of logic command signals for application over the output cables 50, 53 to effect the operation of components within closed loop controller 47 and the operation of pulse width modulation circuit 52. Subsequent explanations will make it apparent that the reaction torque computation circuit 60 is an important component of the present invention.

Reaction torque computation circuit 60 also provides an average torque level signal on line 71, by averaging the instantaneous torque signal received from the transducer over a given time period. This average torque signal is applied to an adaptive computation circuit 93, which produces output signals that vary as a function of the average torque level. The first output signal from adaptive computation circuit 93 is applied over line 92, 94 as an input command signal to closed loop controller 47. This first output signal affects the controller operation and controls both the slope of the "ramp" portion of torque curve 35, and the gain of the closed loop controller and is used to control the control valve 56 as will be explained. The second output signal from adaptive computation circuit 93 is applied over conductor 95 to a feed-forward circuit 96, which in turn passes a signal over line 101 to pulse width modulation circuit 52. The feed-forward circuit in effect compensates the control valve 56 operation for the time required (*t*0–*t*1, FIG. 3) to fill the piston before the static phase of the shift is commenced. Hence the adaptive computation circuit 93 and the feed-forward circuit 96 improve the overall regulation of the closed loop control system of this invention.

FIG. 4 depicts the basic electronic control of the invention in more detail. Reaction torque computer circuit 60 is shown to include several stages, with the line 45 being coupled both to the input side of an integrating stage 65 and, over line 66, to one input connection of a summation stage 67. The output side of integrating stage 65 supplies the integrated torque signal over line 68 to a passive circuit 70, effective to multiply the signal on line 68 by the ratio 1/T, representing a time division to produce on line 71 a signal which represents the average driveline torque provided on shaft 42 over the time period T. The application of logic command signals LC2 to the integrating stage 65 and LC3 to the memory stage 72 are shown, with each logic command signal being generated by the logic control circuit 51 as will be explained hereinafter. The output of memory stage 72 then supplies the average driveline torque signal (for the time T) over line 73 to the passive stage 74, effective to multiply this signal by 1/R or provide on line 75 a signal which represents the average driveline torque adjusted for the gear ratio R. This signal on line 75 is the other input signal to summation stage 67, which then provides the reaction torque signal on line 61 for application to the logic control circuit 51.

Those skilled in the art will appreciate that the reaction torque computer circuit 60 is depicted with simplified analog components to provide a reaction torque signal on line 61 as a function of a received instantaneous torque signal on line 45. This is done with the illustrated integrating, memory, divide down and summation stages. It will be apparent that a microprocessor or other digital circuits can be connected to operate in a known fashion to produce the reaction torque signal on line 61 in response to the received instantaneous torque signal on line 45. Hence the terms "reaction torque computation circuit" and "adaptive computation circuit", as used herein and in the appended claims, embrace both the analog and digital forms of such circuits which are well known and understood in this art.

Shift point computer 77 provides a signal on line 62 to the logic control circuit 51 when a "shift" command is initiated. Likewise a shift pattern lever 78 is conventionally used to provide the shift pattern signal on line 63 to the logic control circuit.

The instantaneous output torque signal on line 46 is applied as shown to the closed loop controller 47, and is initially applied to a feedback filter circuit 80. The signal passes through a first passive component 81 and an active stage 82; a passive component 83 is coupled in parallel with stage 82. The passive components depicted by the circular symbols (such as 81, 83) can be implemented by the use of a fixed or variable resistor. Filter circuit 80 provides a filtered output signal on line 84 which is applied both to the input side of a memory stage 85 and, over line 86, to one of the input connections of a summation stage 87, which also receives second and third input signals. The second input signal is received over line 88 from memory 85, which receives not only the filtered input signal on line 84 but also receives an LC5 logic command signal from logic control stage 51. All of the logic command signals (LC1–LC5) are operational mode signals. As will be explained further, they issue in a time sequence (*t*0–*t*3, FIG. 3) to regulate the operational state of other components, rather than provide information or command input signals to those components. The third input signal received by summation stage 87 is received over line 90 from another active stage 91, an integrator stage which is connected to provide a ramp slope signal as a function of a level or amplitude signal received over line 92 from an adaptive computer 93. The ramp slope stage 91 also receives an LC5 logic command signal. Thus stage 87 receives a feedback signal on line 86, and on lines 88, 90 receives ramp-determining signals which are collectively termed the "input command" signal.

Figure 5:
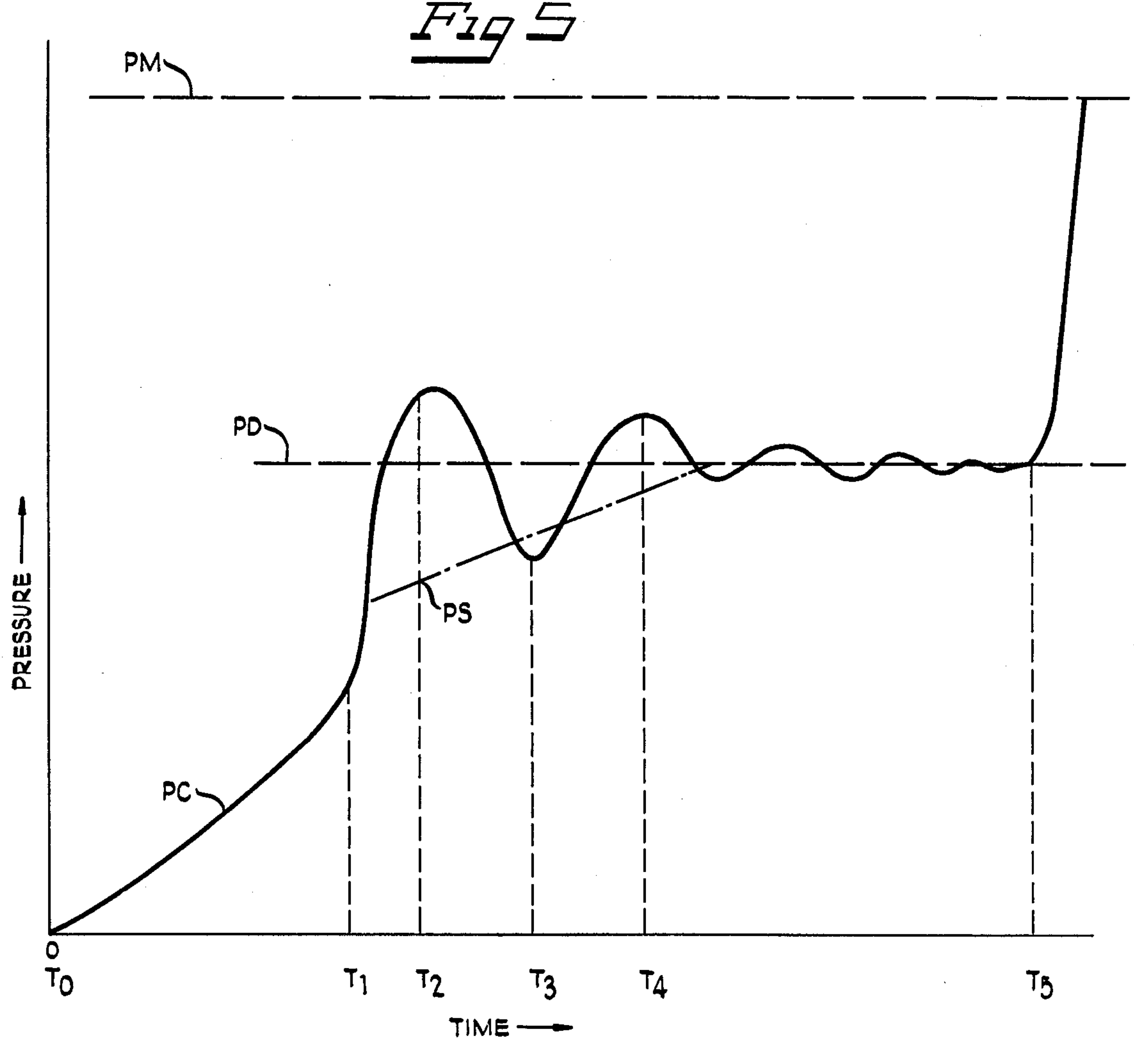
FIG. 5 is a graph showing pressure and time relationships for a friction element.

The adpative computer 93 in FIG. 6 includes three circuits, which will be described hereinafter, each of which receives the signal over line 71 from the reaction torque computer denoting the average driveline torque during a time period T. The instantaneous driveline torque varies because of the engine variations, torsional vibrations, wheel slip and other irregularities. Hence an average signal is provided to avoid erroneous operation of the system, and this average signal must be provided in a preset time frame during the shift sequence. To afford an idea of the operating times, the time duration from *t*1 to *t*2 (FIG. 3) is about 50 milliseconds. From the average torque signal on line 71 and the information stored in the computer, a level signal is provided on line 92 to regulate the torque during the shift period, in that it generally controls the slope of the "ramp" of the torque curve as represented by curve 35 in FIG. 3 and will thereby control pressure curve as shown in FIG. 5. The adaptive computer 93 also provides a gain-control signal on line 94, and a third output signal on line 95 which is coupled to a feed-forward circuit 96. This feed-forward circuit includes a first passive element 97, an active component 98 which receives not only the signal from component 97 but also an LC4 logic command signal, and an output active component 100 for providing an output signal from the feed-forward combination on line 101. A passive feedback component 102 is coupled around active stage 98, and a direct signal connection is provided from the input side of element 97 over conductor 103 to one input connection of stage 100. This feed-forward circuit is an anticipation circuit for providing a signal over line 101 which tends to compensate for the time delay required to fill the piston volume between times *t*0 and *t*1, before the static phase of the shift sequence begins.

The output signal from feed-forward stage 100 is passed over line 101 to another active element 104, which operates as a switch that is closed upon receipt of an LC4 logic command signal to provide an output signal over line 105 to the pulse width modulation circuit 52. PWM circuit 52 thus receives four input signals: the error signal over line 48 from the closed loop controller 47; the feed-forward compensating signal over line 105; and the logic command signals LC1 and LC2 from the logic control circuit 51. Because LC1 is only generated and supplied over cable 53 when a signal is produced by movement of the shift pattern lever, this signal is produced by movement of the shift pattern lever, this signal need not be further described.

In closed loop controller 47, loop gain control circuit 106 received both the gain-regulating signal over line 94 from the adaptive computer 93, and an output signal over line 107 from summation state 87. The output signal from gain control circuit 106 is passed through another passive component 108 to a loop compensation circuit 110, which comprises an active state including an integration circuit 111, a parallel-coupled passive element 112, another passive element 113 coupled between the output side of stage 111 and one input connection of the active stage 114, and a conductor 115 connected to pass a signal directly from component 108 to one input connection of stage 114. The output side of stage 114 is then the closed loop controller output signal, or the error signal, for application to the pulse width modulation circuit 52.

Figure 6:
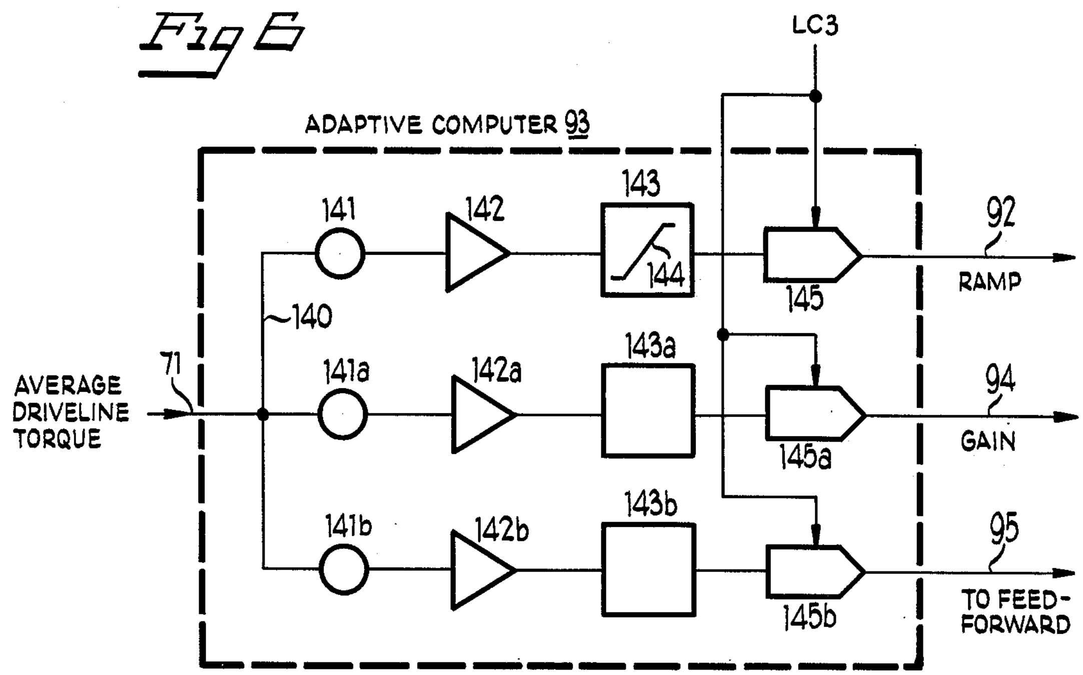
FIG. 6 is a block diagram of an adaptive computation circuit used in a preferred embodiment of the invention.

FIG. 6 depicts in a simiplified form the circuit arrangement of adaptive computer 93, which receives two input signals. The first, on line 71, is a function of the average drive line torque, and the second is a logic command signal LC3 which issues at the beginning of the static phase of the shift. For example, the torque signal on line 71 is applied over a common conductor 140 to a first passive component 141 for initially adjusting the gain of the received signal, which is then passed over a buffer amplifier 142 to the input side of a variable gain amplifier 143. The sloping gain characteristic 144 shown within this amplifier indicates that a preset gain can be provided by selection of the appropriate component to provide the degree of slope and thus the desired gain. The output of the adjustable gain stage 143 is applied to the input side of a memory stage 145. This memory stage continually receives the input signal from stage 143 and, when the logic command signal LC3 is received, the signal level then present is stored and continually presented on the output conductor 92 for regulating the ramp portion of the torque curve (FIG. 3). Similar components referenced with the letters "*a*" and "*b*" are provided to store and hold signals, on conductors 94 and 95, for application to gain control stage 106 and the feed-forward circuit 96 when the logic command signal LC3 is provided. Other suitable circuits can be utilized to implement the adaptive computation, with the only requirement being the individual modification of the input torque signal on line 71 in the different channels, and the storage of the resulting modified signals at time t1 when LC3 issues.

The control valve assembly 56 as illustrated in FIG. 4, is comprised in general of a diaphragm control valve 200 and a diaphragm exhaust valve 202. The diaphragm control valve 200 includes a housing 204 having an inlet port 206, an exhaust port 208 and pressure ports 210 and 212. The diaphragm valve 200 has a diaphragm section 214 and a control section 216. Diaphragm section 214 includes a flexible diaphragm 218 separating the diaphragm section into chambers 220 and 222. The diaphragm section includes a spring 224 urging the flexible diaphragm section 218 in a downward direction. Mounted on the diaphragm 218 is a rubber or plastic sealing member 226 which is engageable with the housing 204 in a manner to sale off the outlet pressure port 210. Diaphragm 218 further includes an orifice 230 between the chambers 220 and 222.

Control section 216 includes a reciprocating control or piston member 232 which is engageable to seal an exhaust port 234 formed in the wall separating sections 216 and 214. The member 232 has a nose portion which may be of conical configuration at either end thereof, engageable to seal exhaust port 208 in an upper position and engageable to seal exhaust port 234 when in a lower position. A solenoid 55, surrounds piston member 232 and when actuated by electrical energy through conductor 54 connecting same to pulse width modifier 52 will serve to move the valve to its position closing exhaust port 208. When no current is received, in the solenoid 55, a spring 238 will move the member 232 to its lower position sealing port 234.

Exhaust port 208 is connected to a fluid sump 250 which is illustrated schematically in various parts of the diagram, but the intention is of course that there would be a common fluid sump 250. A source of fluid pressure 252 which may include a pump and a regulating valve or other source of fluid pressure is connected by conduit 57 to inlet port 206. Outlet pressure port 210 is connected by conduit 254 with a one-way or check valve 256 which has in parallel therewith a bypass passage 258 having a restriction 260 therein. The check valve 256 and bypass 258 are connected by conduit 262 with exhaust valve 202 through an inlet port 264. Exhaust valve 202 has an outlet port 266 connected to sump 250 by conduit 268. A conduit 270 connects exhaust port 212 of valve 200 to a control port 272 of exhaust valve 202 and to conduit 254. Check valve 256 and bypass 258 are in addition connected by conduit 43 to clutch 26 for planetary transmission 20. Thus, by control of the pressure in conduit 43 by the control valve assembly 56 the pressure at the clutch 26 will be regulated in the engagement thereof and thereby the torque capacity of the clutch will be regulated as it is engaged.

The exhaust valve 202 includes a flexible diaphragm 290 dividing the valve into chambers 292 and 294. The flexible diaphragm 290 has a rubber or plastic sealing member 296 mounted thereon adapted to seal the outlet port 266 when flexible diaphragm 290 is pulled into its lower most position to engage member 296 with the casing for the diaphragm valve.

The operation of the control valve assembly 56 is that, pressure being supplied to conduit 57 and chamber 220 when a shift is to be initiated and clutch 26 to be engaged piston member 232 is actuated to open port 234 and pressure in chamber 220 will move flexible diaphragm up and allow the pressure to flow through outlet pressure port 210 and conduit 254 through one-way check valve 256 to clutch 26. If piston member 232 is moved to its lower position closing port 234 flow into the chamber 216 will be interrupted and pressure will be communicated through orifice 230 into chamber 222 and equalize with pressure in chamber 220, thus spring 224 can at this time move the diaphragm down to engage the sealing member 226 with the casing 204 and seal off outlet port 210 and interrupt the pressure connection to the clutch through conduit 254. When solenoid 55 is actuated, piston member 232 will move to a position blocking exhaust port 208 and opening port 234, the pressure in chamber 222 will drop as it flows through outlet port 212 and conduit 270. This pressure drop will move diaphragm 218 up to open pressure flow through port 210 and conduit 254.

After the clutch 26 has been engaged and it is desired to release same, piston member 232 is held in its lower position by spring 238 exhausting conduit 270 through port 212, chamber 216, port 208, to sump 250. Since the flow path through this passage is restricted by restriction 260, exhaust valve 202 becomes operative in that when pressure is exhausted from conduit 270 the pressure in chamber 292 will be reduced moving diaphragm 290 up by the pressure in conduit 43 and conduit 262 and opening a flow path to sump 250 through port 266 and conduit 268, to provide for rapid release of clutch 26 when desired.

Referring to FIG. 5, an up shift can now be described involving use of the control valve assembly 56, and the electronic control unit 14. Electronic control unit 14 is torque responsive to control the control valve assembly and thereby control clutch 26, as it is engaged. Referring to FIG. 5, a diagram of the time and pressure relationship in the clutch 26 is illustrated during a typical shift. The solid line represents the pressure in the clutch as it rises to bring the clutch into full engagement. The horizontal line PD represents the desired pressure level in the clutch which is to be obtained to hold it with proper force to insure it has the torque capacity required for the ratio change established. The PD line may be on a slope to provide a more gradual engagement as is shown by phantom line PS rather than the straight horizontal line PD. This slope of the pressure line will be determined by the pressure or torque ramp which is to be provided by the adaptive computer 93 as described above. As is pointed out above, the adaptive computer can have information stored therein which will be responsive to the shift point computer, the shift pattern lever and the torque signal from the torque sensor 44 at any given time to either produce the pressure ramp PD for the clutch 26 or a more gradual or sloping pressure ramp PS.

This type of control can be carried out by the torque responsive electronic control system 14 since the pressure existing at the clutch 26 is closely related to the torque in the output shaft 42, and change in engaging pressure at clutch 26 will vary the torque in the output shaft in a direct relationship. Thus, by having stored information as to the torque ramp to be followed for output shaft 42 within the adaptive computer 93, and since the pressure in the clutch 26 will directly effect the torque level in output shaft 42, the ramp of the pressure rise in clutch 26 may be controlled by the use of the torque signal in the output shaft 42, by torque sensor 44. As will be explained, as the clutch 26 is engaged errors as reflected by the output torque varying from the predetermined ramp at any given time will effect the control valve assembly 56, to compensate for such error and force the clutch pressure level to follow as closely as possible the ramp PD or PS for example, for engagement of the clutch.

The sample shift to engage clutch 26 as shown in the pressure curve PC full line FIG. 5, will take place as follows: at time *t*0, the shift would be initiated by the shift point computer, and signal the logic control 51, to initiate the shift which will through conduit 53 affect the pulse width modulator 52 to begin cycling piston member 232 of control valve 200 to engage clutch 26. As will be explained the pressure which will be supplied to conduits 254, 43 and clutch 26, is controlled by use of the pulse width modulation technique as described in the aforementioned copending application, in that the piston member 232 cycles between its position, closing port 234, and closing exhaust port 208. With the port 234 closed, the pressure in conduit 254, 43, clutch 26 will be at a maximum and with exhaust port 208 closed the pressure would be at a minimum. The function of the pulse width modifier 52, cycling member 232 between positions is to vary the pressure level in the conduit 43, by tending to have one port or the other open longer dependent upon an error signal received by the control mechanism 14 from the torque sensor 44 which indicates deviation from the predetermined pressure ramp shown in FIG. 5.

As mentioned, at time *t*0, a shift signal is given and the pulse width modulator 52 begins to cycle piston 232. Pressure will be admitted from line 57 through the chamber 220, pressure port 210, conduit 254, conduit 43 to engage the clutch. At this time the flow through the port 234 is relatively restricted and the flow through port 234 at orifice 230 drops the pressure in pressure chamber 222 to engage the sealing member 226 with the port 234 tending to close same and allow maximum flow in conduit 254, 43 and clutch 26. At time *t*1 the clutch servo motor has been filled and the slack within the friction elements has been taken up and a pressure rise begins as shown by line PC at a much steeper angle than previously.

At time *t*2 the pressure rise at the friction element of clutch 26 has risen beyond the ramp PD and creates an error torque signal as sensed by torque sensor 44, and the torque signal is relayed through the adaptive computer, closed loop controller 47 to affect pulse width modulator 52, and tend to cycle the piston member 232 to close port 234 and open exhaust port 208. With port 234 closed the pressure will equalize in chambers 222 and 220 of diaphragm section 214 and close outlet port 210 by engaging sealing member 226 therewith, since the pressures are balanced and spring 224 will move diaphragm 218 downwardly. Also at this time pressure may exhaust through conduit 43, bypass 258, conduit 270, chamber 216, outlet port 208 to the sump 250. This will tend to reduce the pressure on the friction element, and as shown just after time *t*2 the pressure on the friction element begins to drop. The pressure will drop, until a new error signal is created by the torque sensor 44, sensing a torque level corresponding to a pressure below the ramp PD and at point *t*3, this error signal will actuate the pulse width modifier 52, to cycle piston 232 to tend to close port 208, and open port 234. Pressure oil will then flow through orifice 230, chamber 214, port 234 outlet port 212, conduit 270 to friction element 26 to restore pressure buildup in the clutch 26. If the pressure of the clutch 26 is dropped to a low enough level, the flow through the orifice 230 will be such as to create a sufficient pressure drop between chamber 222 and 220 to lift diaphragm 218, and provide additional flow to the friction element through pressure port 210 and conduit 254. This will restore pressure on the friction element 226 and the pressure at time *t*3 will again begin to rise.

The cycle is repeated when the pressure exceeds the ramp PD as shown at time *t*4 at which time again, the piston 232 will be cycled by solenoid 55 as controlled by pulse width modulator 52 to tend to close port 234 and open port 208 as explained above. Eventually, line PC begins to stabilize at the PD level and the member 232 will be signaled to close port 208 and stay there, as at *t*5 whereby PC rises rapidly to full pressure or line PM.

In this manner it can be seen that by use of the pulse width modulator circuit, the control valve assembly 56 provides a quickly responsive system to closely follow the control signals to control pressure buildup and thereby torque rise through the friction element and thereby the torque buildup in the output shaft, such that the speed and quality of the shift can easily be controlled by the electronic control system 14. For a more detailed description of the operation of electronic control assembly 56, copending application Ser. No. 661,896, filed Feb. 27, 1976 may be consulted and the disclosure of same is incorporated herein by reference.

In addition to the advantages of the very precise control provided by use of the diaphragm system disclosed, it should be pointed out that the diaphragm valve system is significantly advantageous, in that the valve system can be constructed in an extremely compact manner as known in the prior art, since very little travel is needed in a diaphragm element to seal or open a pressure port, and in addition the valves can be stacked one on another in very limited spaces. It is recognized that spool valves such as disclosed, in the above mentioned copending application, require greater lengths of travel and greater space than do diaphragm valves. In addition, more precise machining is required in such spool valves, in that the spool must of course closely fit the bore in which is mounted to provide adequate fluid sealing whereas with the use of diaphragm valves, such precision is not required in that by properly sizing the spring and the areas of the diaphragm, there is no need for precise machining. Therefore, the main advantage of the present system, is that the cost of the control valve assembly 56 may be significantly reduced and in addition space requirements of a more limited nature may be met by the unique diaphragm control valve assembly 56 disclosed and described herein.

In addition, the use of the diaphragm valve assembly provides an advantage in that it is less sensitive to dirt than a spool valve and less subject to leakage in that it has no fixed clearances as in a spool valve construction or other dimensionally precise structures.

Further, the diaphragm valve as used herein is unique in that when the pressure in chamber 222 drops, the member 226 will move to close off port 234, the pressure in chamber 222 then rises to a value equal to the pressure in chamber 220 minus the force of spring 224, due to orifice 230. Therefore, diaphragm 218 feels a relatively equal pressure on each side and thereby is not damaged or distorted as is possible if the diaphragm was required to withstand a relatively large pressure differential on either side thereof.

In addition to the above advantages, it should be noted, by use of check valve 256 and orifice 260, as well as two flow paths 254 and 270 between valve 200 and clutch 26, two flow rates are provided both on fill of clutch 26 and exhaust of pressure from clutch 26, adding to the flexibility of controlling the clutch.

I claim:

1. An electronic control system for regulating change of gear ratio in a gear set which has an input connection for receiving drive from an engine and an output mechanical drive connection for supplying drive torque to a load, comprising an electronic control unit having an output connection coupled to the gear set to effect a change of gear ratio when the control unit supplies a change-gear signal and including a diaphragm valve having a variable position diaphragm;

a sensor, positioned adjacent the mechanical output driving connection of the gear set, for providing an output torque signal which varies as a function of the output drive torque provided by the gear set;

means, coupled between the sensor and the control unit, for supplying the output torque signal to the control unit in order that the control unit can control the change of gear ratio in response to the output torque signal; said diaphragm valve including a reciprocating piston member responsive to an electrical signal from said control unit to open and close fluid ports in said valve to control the position of said diaphragm to control the change of ratio, said transmission including a fluid actuated friction device for changing gear ratio, said friction device being connected to said diaphragm valve, said diaphragm valve having two fluid chambers separated by said diaphragm, said valve having an inlet port connected to said source of pressure and one of said chambers, said valve having an outlet pressure port in said one chamber connected to said friction device, and said valve including a fluid exhaust port and said piston being adapted to open said exhaust port when positioned to close said outlet port, said exhaust port being connected to said friction device and adapted to reduce the pressure therein when open.

2. An electronic control system for regulating change of gear ratio in an automatic transmission and at least one fluid actuated device for receiving a fluid under variable pressure, comprising:

a transducer, positioned to sense the torque at the transmission output driving connection and to provide an electrical signal which varies as a function of the output torque;

a control valve assembly coupled between a fluid source and the fluid actuated device for regulating the fluid pressure to effect and control a change in gear ratio, said control valve assembly including a diaphragm valve connected to said fluid actuated device; said diaphragm valve including a diaphragm and an electrically actuated member controlling the position of the diaphragm;

a closed loop controller, coupled between the transducer and the electrically actuated member, to receive the output torque signal as a feedback signal and provide an error signal for regulating operation of the diaphragm valve as a function of the error signal;

a reaction torque computation circuit, connected to receive the output torque signal from the transducer and to produce a reaction torque output signal; and a logic control circuit, coupled to the reaction torque computation circuit and operative to provide a plurality of logic command signals for application to the closed loop controller upon receipt of the reaction torque signal to regulate the gear ratio change by regulating the fluid pressure supply to said fluid actuated device.

3. An electronic control system as claimed in claim 2, and in which said electrically actuated member is a piston member with a solenoid positioned to regulate the position of said piston member as a function of a received electrical control signal, and said system further comprises a pulse width modulation circuit, connected at its output side to supply the electrical control signal to regulate the solenoid operation, and having an input connection for receiving the error signal from the closed loop controller.

4. An electronic control system as claimed in claim 3, in which said reaction torque computation circuit includes means for producing an average torque signal at a connection point, and in which said control system further includes an adaptive computation circuit, having an input circuit coupled to said connection point of the reaction torque computation circuit, operative to provide a plurality of output signals to modify operation of the closed loop controller as a function of the average torque signal received from the reaction torque computation circuit.

5. An electronic control system as claimed in claim 4, and in which said closed loop controller comprises a summation stage connected to receive said feedback signal, and a ramp control stage, connected to receive one of the output signals from the adaptive computation circuit and to form a ramp-controlling output signal which is applied to an input connection of said summation stage, such that the ramp-forming signal is a function of the average torque signal supplied to the adaptive computation circuit and whereby the pressure level of said fluid actuated device is controlled to follow said ramp controlling output signal.

6. An electronic control system as claimed in claim 3, wherein said diaphragm valve has two fluid chambers separated by said diaphragm, said valve having an inlet port connected to a source of pressure and one of said chambers, said valve having an outlet pressure port connected to said friction device and said one chamber, an outlet port connected to said other chamber, said piston member adpated to control opening and closing of said outlet port to control the position of said outlet port to control the position of said diaphragm, and said diaphragm having a position closing off said outlet pressure port when said outlet port is closed.

7. A control system as claimed in claim 6, wherein said valve includes a fluid exhaust port and said piston being adapted to open said exhaust port when it is positioned to close said outlet port, said exhaust port being connected to said friction device and adapted to reduce the pressure therein when open.

8. A control system as claimed in claim 7, wherein a supplementary diaphragm exhaust valve is connected to said friction device which is adapted to open an exhaust path when exhaust port in said diaphragm valve is opened by said piston member.

* * * * *